Figure 1:
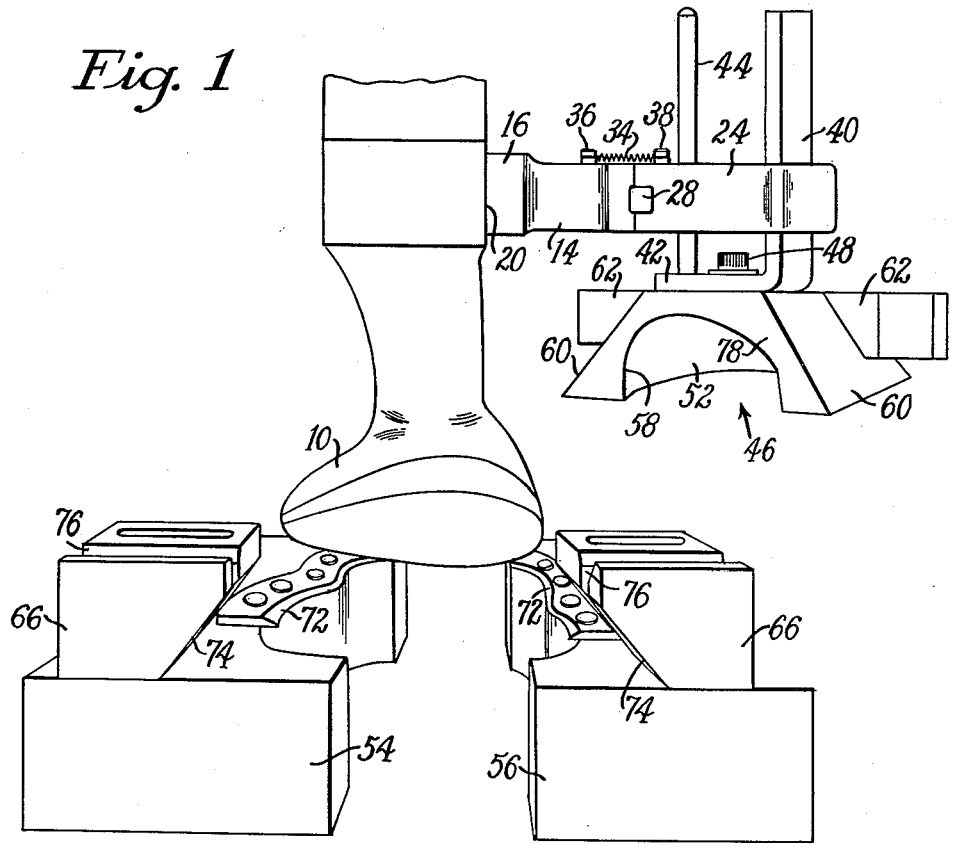

March 16, 1965  N. A. LISTER  3,173,173
MACHINES FOR MOLDING TOE CAPS ONTO LASTED SHOES
Filed March 20, 1963

Inventor
Neville A. Lister
By his Attorney

United States Patent Office 3,173,173
Patented Mar. 16, 1965

3,173,173
MACHINES FOR MOLDING TOE CAPS
ONTO LASTED SHOES
Neville A. Lister, Leicester, England, assignor to United Shoe Machinery Corporation, Flemington, N.J., a corporation of New Jersey
Filed Mar. 20, 1963, Ser. No. 266,617
Claims priority, application Great Britain, Apr. 13, 1962, 14,317/62
6 Claims. (Cl. 18—17)

This invention relates to molding machines and is herein illustrated in its application to machines for molding and attaching parts to lasted shoes and curing or vulcanizing such parts. It is to be understood, however, that the invention is not limited to machines which perform both a molding and a vulcanizing operation, but on the contrary, the invention is applicable to machines for injecting into a mold cavity a fluid plastic which cures by the dissipation of heat therefrom.

The patent to Barton No. 2,922,191, granted January 26, 1960, discloses a machine for molding and attaching outsoles to shoe bottoms and curing or vulcanizing the outsole substance. Machines of this type are provided with a shoe form which receives a lasted shoe onto which a sole is to be molded. The shoe form is initially positioned in a loading station where a lasted shoe, onto which a sole is to be molded and vulcanized, is mounted on the form. In the operation of the machine the shoe form advances from the loading station to a molding station where it is brought into mold closing relation to side mold members within which a sole is to be molded and pressed forcibly against the shoe bottom by a bottom mold member arranged to move upwardly within and in contiguous relation to the side mold members.

It is an object of the present invention to provide in a machine of the type above described, means for molding a toe cap onto the toe portion of a shoe such, for example, as a shoe having a steel toe box which is to be insulated against the occurrence of sparks which might be caused by accidental contact of such a box with metallic objects or the like.

With the above object in view, the present invention consists in the provision in a machine of the type above described of a toe cap mold mounted on a carrier on the shoe form, the carrier being movable relatively to the shoe form between a retracted position and an intermediate position in which the toe cap mold is spaced above and registers accurately with the toe end portion of the shoe form. From said intermediate position the toe cap mold is movable relatively to the carrier heightwise of the shoe form between said intermediate position and a molding position in which it is in mold closing relation to the shoe form.

In accordance with a feature of the invention, suitable registration means is provided for locating the toe cap mold relatively to the shoe form and the side mold members. The illustrated registration means comprises tongued and grooved members provided in the side mold members and the toe cap mold, respectively, and arranged to effect relative registration between the toe cap mold and the side mold members.

In order to insure firm engagement of the toe cap mold with the side mold members, said members are provided with means herein illustrated as cam blocks constructed and arranged to press the toe cap mold against the side mold members during the closing movement of said members. In the illustrated organization, the cam blocks serve as elements of the means for effecting relative registration between the toe cap mold and the side mold members and to that end the cam blocks are grooved to receive tongues projecting from the toe cap mold.

It will be understood that the present invention is applicable to machines for molding caps, covers or the like onto parts of lasted shoes other than the toe portion.

This invention will now be described with reference to the accompanying drawings and pointed out in the appended claims.

Figure 2:
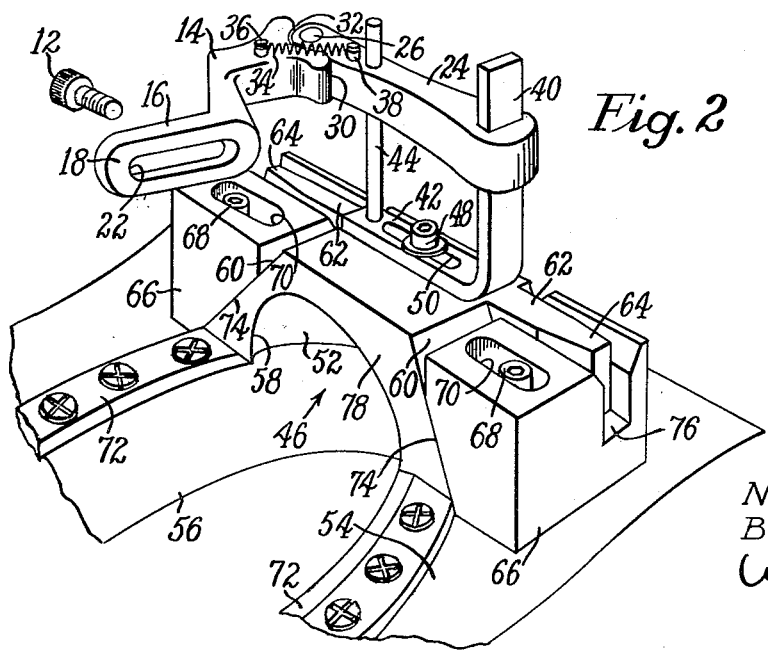

In the drawings,

FIG. 1 is a perspective view illustrating mold elements and work supporting means of a machine embodying the features of the present invention, the mold elements being shown in their mold open position; and FIG. 2 is a perspective view taken from a different angle from FIG. 1 showing portions of the mold elements in their relative position when the mold is closed.

The invention is herein illustrated as embodied in a machine of the type disclosed in the Barton patent hereinbefore referred to. The machine illustrated in the Barton patent is provided in each of its two stations with mold elements for forming a shoe sole and vulcanizing it onto the bottom of a lasted shoe which has been prepared for the attachment of a sole thereto by vulcanization. The mold elements comprise two side mold members movable toward and from each other and a bottom mold member having the peripheral contour and the profile of a shoe sole, said bottom mold member being positioned between the side mold members and arranged to move upwardly in contiguous relation to the inner walls of the side mold members when said members are in their mutually closed position. For supporting a lasted shoe for the vulcanizing operation there is provided in each station of the machine a shoe form which moves downwardly into contact with the side mold members to close the mold cavity. In the rest position of the machine each shoe form is positioned in a loading station with its bottom surface facing the operator and inclined to facilitate the mounting of a lasted shoe thereon. From the loading station the two shoe forms swing downwardly and rearwardly into an intermediate station in which they are in registration with, but spaced above, the mold elements. From the intermediate station the shoe forms move downwardly simultaneously into their respective molding stations in which the lasted shoe on the form is in mold closing engagement with the closed side mold members.

Referring to FIG. 1, the numeral 10 identifies a shoe form in one station of the machine, said shoe form being shown in its intermediate station above referred to. Attached to the shoe form by means of a knurled headed screw 12 (FIG. 2) is an angular arm 14 which has a rectilinear forward portion 16 provided with a plane surface 18 which, as shown in FIG. 1, lies in contiguous relation to a vertical plane surface 20 in the base portion of the shoe form 10. The screw 12 extends through a longitudinal slot 22 formed in the rectilinear portion 16 of the arm. As shown in FIG. 2, the rear portion of the arm 14 is bifurcated to provide a joint for the articulation of a carrier or arm 24 pivotally mounted upon a pin 26 fixed in a tongue 28 (FIG. 1) formed between the bifurcated portions of the arm 14 and received within a suitable notch formed in the articulated end portion of the arm 24. The swinging movement of the arm 24 relatively to the arm 14 is limited by the engagement of the articulated end portion of the arm with abutment surfaces 30 and 32 (FIG. 2) formed in the bifurcated end portion of the arm 14. The arm 24 is held alternatively at either end of its movement by a spring 34, one end of which is anchored to a pin 36 mounted in the arm 14 and the other end to a pin 38 mounted in the arm 24, the arrangement of the spring being such that it passes across the fulcrum pin 26 during the swinging movement of the arm 24. Slidably mounted in an opening, rectangular in cross section extending vertically through the free end portion of the arm 24 is an angle arm 40 having a horizontal portion 42 extending beneath the arm 24. In order to stabilize the bent arm 40 and prevent angular movement of its horizontal portion 42 relatively to the arm 24, a vertical rod 44 is slidably mounted in a suitable bore in the arm 24 and has its lower end portion fixed in the horizontal portion 42 of the arm 40. Fixed to said horizontal portion of the angle arm is a toe mold member 46 which provides means for vulcanizing a toe portion or cap onto a shoe supported on the shoe form 10. The toe mold is removably secured to the angle arm 40 by a headed screw 48 which extends through a longitudinal slot 50 (FIG. 2) formed in the horizontal portion of the angle arm and into a tapped bore formed in the toe mold. When the toe mold is in its retracted position relatively to the shoe form 10 illustrated in FIG. 1 it is held against downward movement by frictional engagement of the angle arm 40 and the rod 44 in their respective apertures in the arm 24. The toe mold is, however, readily movable manually from its position relatively to the arm 24 illustrated in FIG. 1 downwardly into its mold closing position illustrated in FIG. 2. The toe mold member has formed therein a cavity 52 which is shaped to form a suitable toe cap on the toe portion of a shoe mounted on the form 10. In its operative position shown in FIG. 2 the toe mold is so arranged that its plane bottom surface engages the upper surfaces of side mold members 54 and 56 when said side mold members are in their mutually closed position shown in FIG. 2. The cavity 52 terminates in an inwardly extending lip 58 which seats against a shoe upper on the form 10 to form the rear edge of the toe cap. The illustrated toe mold member has formed therein beveled side walls 60. Extending outwardly in opposite directions from the side walls 60 are tongues 62 having tapered end portions 64. For clamping the toe mold against the upper surfaces of the side mold members each side mold member is provided with a cam block 66 secured to its toe end portion. For attaching each block to its side mold member a headed screw 68 extends through a slot 70 formed in the block and into a tapped bore in the side mold member. The slot is widened at its upper extremity to receive the head of the screw 68 as shown in FIG. 2. Secured to the upper surfaces of the side mold members are crease plates or welt plates 72 which project inwardly from the inner walls of the side mold members as shown in FIG. 1 and form the upper surface of the outwardly extending margin of the sole. In the illustrated organization the crease plates terminate at the tip line defined by the toe cap so that the vertical face 78 of the toe mold member 46 is arranged in contiguous relation to the forward extremities of the crease plates 72 when the toe mold is in its operating position shown in FIG. 2. The blocks 66 have undercut cam faces 74 formed on the same angle to the horizontal as the beveled side walls 60 of the toe mold member. Formed in each of the blocks 66 is a groove 76 extending widthwise of the block and arranged to receive the tongue 62 extending outwardly from the toe mold member. At its upper portion the walls of each groove 76 are beveled outwardly as shown in FIG. 2 to facilitate the entrance of the tongue 62 into the groove during the downward movement of the shoe form 10 into its operating position.

In the operation of the machine a lasted shoe upper onto which a sole is to be vulcanized is mounted on a shoe form in the loading station and a suitable charge of uncured rubber is placed on the bottom mold member. The shoe form is then swung downwardly and rearwardly from its loading station into its intermediate station illustrated in FIG. 1. Thereupon a charge of uncured rubber suitable for the molding of a toe cap is placed on the toe portion of the shoe whereupon the toe mold member 46 is swung from its position illustrated in FIG. 1 into a position in which it registers with the toe portion of the shoe form 10 and is then moved downwardly into adjacent relation to the side mold members. In this position of the toe mold member the uncured rubber sheet which is to form the toe cap is lightly held between the toe mold and the toe portion of the shoe form. During the downward movement of the toe form the tapered end portions of the tongues 62 enter the grooves 76 formed in the blocks 66 thus determining the angular disposition of the toe mold member with relation to the side mold members.

In the power cycle of the machine the shoe form moves downwardly into its mold charging station carrying with it the lasted shoe upper and the toe mold member 46. The side mold members move inwardly into their mutually closed position illustrated in FIG. 2, and as they approach each other the tongues 62 extending outwardly from the toe mold member advance into the grooves 76 in the blocks 66 thus accurately determining the position of the toe mold member lengthwise of the side mold members. During the final stage of the movement of the side mold members toward each other the cam faces 74 of the blocks 66 engage the beveled side walls 60 of the toe mold member and thus force the toe mold member downwardly into firm contact with the upper surfaces of the side mold members so that there is no flow of rubber between the mutually contacting surfaces of the toe mold member and the side mold members during the vulcanizing operation. Upon the completion of the closing movement of the side mold members the bottom mold member (not shown) moves upwardly to apply molding and vulcanizing pressure to the charge of uncured rubber which was previously placed thereon. During the ensuing molding and vulcanizing operation a sole is molded and vulcanized onto the shoe bottom and a rubber toe cap is molded and vulcanized onto the toe portion of the upper.

Upon the completion of the vulcanizing cycle the bottom mold member is moved downwardly, the side mold members are moved away from each other into their relatively open position shown in FIG. 1, and the shoe form is elevated into its intermediate station shown in FIG. 1. The toe mold is then manually retracted into its position illustrated in FIG. 1 whereupon the shoe form is swung forwardly and upwardly into its loading station preparatory to the removal of the shoe from the form and the mounting thereon of another lasted shoe onto which a sole and toe cap are to be vulcanized.

Having thus described my invention, what I claim as new and desire to secure by Letters Patent of the United States is:

1. In a machine for molding soles in situ onto shoe bottoms, a shoe form constructed and arranged to receive a lasted shoe onto which a sole is to be molded and to advance the shoe from a loading station in which the shoe is placed on the form to a molding station wherein the form and the shoe thereon are brought into mold closing relation to mold elements within which a sole is formed and pressed against the shoe bottom, a toe cap mold, and a carrier for the toe cap mold carried by the shoe form and movable relatively thereto between a retracted position in which it is offset from the shoe form and an intermediate position in which the toe cap mold is spaced above and registers accurately with the toe end portion of the shoe form, said toe cap mold and carrier being further characterized by the fact that the toe cap mold is readily movable relatively to the carrier heightwise of the shoe form between said intermediate position and a molding position in which the toe cap mold overlies the toe portion of the shoe form and bears against the mold elements.

2. In a machine for molding a toe cap onto a lasted shoe, a shoe form constructed and arranged to receive a lasted shoe onto which a toe cap is to be molded, a toe cap mold, and a carrier for the toe cap mold carried by the shoe form and movable relatively thereto between a retracted position in which the toe cap mold is offset from the shoe form and an intermediate position in which the toe cap mold is spaced above and registers accurately with the toe end portion of the shoe form, said toe cap mold and carrier being further characterized by the fact that the toe cap mold is readily movable relatively to the carrier heightwise of the shoe form between said intermediate position and a molding position in which the toe cap mold registers with the toe portion of the shoe form.

3. In a machine for molding soles in situ onto shoe bottoms, a shoe form constructed and arranged to receive a lasted shoe onto which a sole is to be molded and to advance the shoe from a loading station in which the shoe is placed on the form to a molding station wherein a sole is molded onto the shoe bottom, mold elements including side mold members relatively movable toward and from each other into and out of mold closing position, a toe cap mold movable between a retracted position in which it is offset from the shoe form and a mold closing position in which it bears against the side mold members, and registration means provided in the side mold members and the toe cap mold, respectively, and arranged to effect relative registration between the toe cap mold and the side mold members.

4. In a machine for molding soles in situ onto shoe bottoms, a shoe form constructed and arranged to receive a lasted shoe onto which a sole is to be molded and to advance the shoe from a loading station in which the shoe is placed on the form to a molding station wherein a sole is molded onto the shot bottom, mold elements including side mold members relatively movable toward and from each other into and out of mold closing position, a toe cap mold movable between a retracted position in which it is offset from the shoe form and a mold closing position in which it bears against the side mold members, and cam blocks fixed to the side mold members and arranged to press the toe cap mold against the side mold members during the closing movement of said members.

5. In a machine for molding soles in situ onto shoe bottoms, a shoe form constructed and arranged to receive a lasted shoe onto which a sole is to be molded and to advance the shoe from a loading station in which the shoe is placed on the form to a molding station wherein a sole is molded onto the shoe bottom, mold elements including side mold members relatively movable toward and from each other into and out of mold closing position, a toe cap mold movable between a retracted position in which it is offset from the shoe form and a mold closing position in which it bears against the side mold members, and tongue and groove means provided in the side mold members and the toe cap mold, respectively, and arranged to effect relative registration between the toe cap mold and the side mold members.

6. In a machine for molding soles in situ onto shoe bottoms, a shoe form constructed and arranged to receive a lasted shoe onto which a sole is to be molded and to advance the shoe from a loading station in which the shoe is placed on the form to a molding station wherein a sole is molded onto the shoe bottom, mold elements including side mold members relatively movable toward and from each other into and out of mold closing position, a toe cap mold carried by the shoe form and movable relatively thereto between a retracted position and an intermediate position in which it registers with that portion of the shoe onto which a cap is to be molded and movable heightwise of the shoe form from said intermediate position into a mold closing position in which it bears against the side mold members, cam blocks fixed to the side mold members and arranged to engage the toe cap mold thereby to effect such heightwise movement thereof and tongue and groove means provided in the cam blocks and the toe cap mold respectively and arranged to effect relative registration between the toe cap mold and the side mold members and to afford guidance for such heightwise movement of the toe cap mold.

References Cited in the file of this patent

UNITED STATES PATENTS

| | | |
|---|---|---|
| 488,570 | Miller | Dec. 27, 1892 |
| 874,366 | Layfield et al. | Dec. 17, 1907 |
| 1,358,068 | Ferguson | Nov. 9, 1920 |
| 2,429,286 | Young | Oct. 21, 1947 |
| 2,922,191 | Barton | Jan. 26, 1960 |
| 2,937,405 | Berggren et al. | May 24, 1960 |

FOREIGN PATENTS

| | | |
|---|---|---|
| 225,969 | Australia | Dec. 10, 1959 |
| 1,103,812 | Germany | Mar. 30, 1961 |
| 1,127,755 | Germany | Apr. 12, 1962 |